Patented July 26, 1932

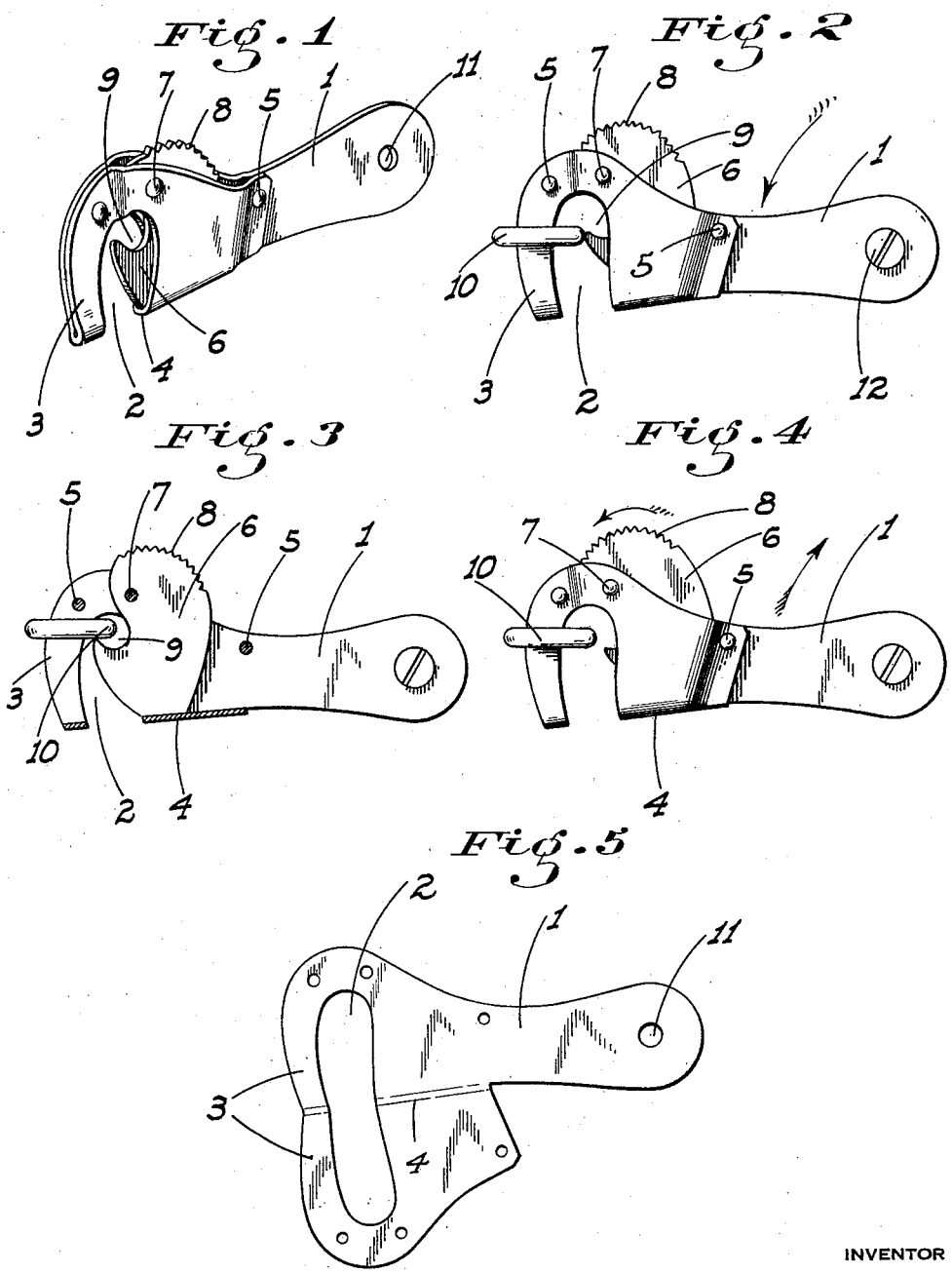

1,868,693

UNITED STATES PATENT OFFICE

BENEDETTO CAPRA, OF SACRAMENTO, CALIFORNIA

SAFETY HOOK FOR SCREEN DOORS

Application filed April 15, 1931. Serial No. 530,195.

This invention relates to a hook for screen doors, my particular object being to provide a hook of this character having an automatically functioning safety catch arranged so that it must be manually released before the hook can be raised from its staple or eye. The practice of unauthorized persons opening screen doors from the outside by inserting a prong or the like through the mesh of the screen and raising up the hook, is thus rendered infeasible.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of my improved hook.

Fig. 2 is a side view of the same, showing the hook as being lowered into engagement with the staple.

Fig. 3 is a sectional elevation of the device showing the staple in its locked position in the hook.

Fig. 4 is a side elevation showing the safety catch member released to allow the hook to be raised from the staple.

Fig. 5 is a plan view of the blank from which the hook is formed.

Referring now more particularly to the characters of reference on the drawing, the hook is preferably made from a blank of sheet metal, which is stamped out to form a shank portion 1, with a deep slot 2 cut toward its outer end so as to form a hook element 3 on said end. The blank is formed with duplicate hook, slot and shank portions, disposed in opposed relation and from the bottom edges of these parts, and integrally connected with each other so that when bent along a symmetrical dividing line 4 and brought together to form the finished device, the hook and the adjacent portions of the shank will register with each other and will of course be of double thickness, as shown in Fig. 1.

Said thicknesses are held together in suitably spaced relation by rivets 5 or the like. Disposed between the shank thickness and the rear of the hook is the safety catch device which consists of a flat member 6, pivoted toward its forward end above the slot 2 on a pin 7.

The upper periphery of the member 6 projects above the hook and is rounded, being toothed or nurled as at 8 to provide a non-slip finger grip.

Below the pivot the member 6 normally projects into the slot 2, and is formed with an upwardly facing curved notch 9. This notch is normally positioned relative to the top of the slot so as to form a circular opening therewith, of sufficient diameter to freely surround the adjacent side of the staple or eye 10 with which the hook is to be engaged. The lower outer point of the notch is normally close to the forward side of the slot 2, so that an opening is left which is too small to permit of the passage of the staple therethru without disturbing or moving the catch member. From the outer point of the notch, the edge of the member 6 slopes toward the rear side and bottom of the slot 2, so that a substantially V shaped opening is formed between the front of the slot or hook and the member 6. The bottom of the member 6 then bears against the connecting web of the two shank portions (which is formed by the bend 4) so as to hold the catch member from further forward movement. The outer end of the shank 1 is provided with a hole 11 to receive a screw 12 or other member by means of which the hook may be flexibly mounted in connection with a door or its casing.

In operation to engage the hook with the staple, it is only necessary to lower the hook into the staple, the side of the latter engaging and pushing aside the sloping side edge of the safety catch. This permits said side of the staple to pass by the otherwise restricted opening normally formed between the front of the slot 2 and the adjacent or forward edge of the member 6 at the notch. This movement of the catch is shown in Fig. 2.

Upon the staple passing clear of the safety catch, the latter by reason of the distribution of its weight relative to the pivot 7, again assumes its normal position as shown in Fig. 3.

To therefore enable the hook to be withdrawn from the staple, it is necessary to manually move the catch notch clear of the slot. This is done by the engagement of a finger with the nurled edge 8 to exert a forward movement to said edge. This movement of the catch is shown in Fig. 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A safety hook device comprising a shank, a hook on one end of the same and forming, with the adjacent portion of the shank, an open-bottomed slot, said hook being adapted to project into the eye of a staple or the like, a catch member disposed rearwardly of the hook and pivoted toward its forward upper end on to the device at the top of the slot, said member projecting into the plane of the slot below the top thereof and so as to project under the staple; the forward edge of the catch member below said projecting portion sloping down to the rear edge of the slot, and means to manually move said portion of the catch member clear of the slot at will.

2. A safety hook device comprising a shank, a hook on one end of the same, and forming, with the adjacent portion of the shank, an open-bottomed slot, said hook being adapted to project into the eye of a staple or the like, and a releasable safety catch member mounted on the device to pass under the staple when fully engaged with the hook but adapted to be deflected by said staple upon the initial engagement of the hook therewith; said shank above and rearwardly of the slot, being formed of double thicknesses spaced apart, the catch member being disposed in the space between said thicknesses.

3. A safety hook device comprising a shank, a hook on one end of the same for engagement with a staple, a catch member disposed toward the rear of the hook and normally projecting into the hook area under the staple, means pivoting the catch in connection with the hook in a manner to enable said catch to be swung downward and rearwardly relative to the staple to a position clear of the rear end of the hook, and a projection on the catch above the pivot and hook for thus manipulating the catch.

4. A safety hook device comprising a shank, a hook on one end of the same for engagement with a staple, a catch member disposed toward the rear of the hook and normally projecting into the hook area under the staple, means mounting the catch in connection with the hook for movement downwardly and rearwardly relative to the hook and staple to a position clear of the rear edge of the hook-opening, and hand means applied to the catch member to thus move the same.

5. A safety hook device comprising a shank, a hook on one end of the same for engagement with a staple, a catch member disposed toward the rear of the hook and normally projecting across the hook area under the staple, the upper edge of the catch member having a notch forming a seat for the adjacent under side of the staple, means pivoting the catch on the hook for downward and rearward movement to a position clear of the staple, and means applied to the catch to thus move the same.

In testimony whereof I affix my signature.

BENEDETTO CAPRA.